United States Patent
Fukuda

(10) Patent No.: US 12,367,866 B2
(45) Date of Patent: Jul. 22, 2025

(54) REDUCING INSERTION ERRORS IN NEURAL TRANSDUCER-BASED AUTOMATIC SPEECH RECOGNITION

(71) Applicant: International Business Machines Corporation, Armonk, NY (US)

(72) Inventor: Takashi Fukuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 18/096,308

(22) Filed: Jan. 12, 2023

(65) Prior Publication Data

US 2024/0242707 A1 Jul. 18, 2024

(51) Int. Cl.
G10L 15/06 (2013.01)
G10L 25/78 (2013.01)
G10L 25/93 (2013.01)

(52) U.S. Cl.
CPC ............ *G10L 15/063* (2013.01); *G10L 25/78* (2013.01); *G10L 25/93* (2013.01); *G10L 2025/783* (2013.01)

(58) Field of Classification Search
CPC ....... G10L 15/063; G10L 15/16; G10L 25/78; G10L 25/93; G10L 2025/783
See application file for complete search history.

(56) References Cited

U.S. PATENT DOCUMENTS

| 8,688,446 B2 | 4/2014 | Yanagihara | |
|---|---|---|---|
| 2019/0043497 A1* | 2/2019 | Georges | G10L 15/1815 |
| 2021/0090549 A1* | 3/2021 | Lombardo | G10L 25/18 |
| 2022/0115008 A1* | 4/2022 | Pust | G10L 15/26 |
| 2022/0246150 A1* | 8/2022 | Pust | G08G 5/003 |
| 2022/0309155 A1* | 9/2022 | Payne | G06N 3/0442 |
| 2023/0107450 A1* | 4/2023 | Chang | G10L 15/18 704/240 |
| 2023/0260521 A1* | 8/2023 | Slocum | G10L 17/18 704/232 |
| 2024/0331696 A1* | 10/2024 | Choi | G10L 15/22 |

OTHER PUBLICATIONS

Sashi Novitasari et al., "Improving ASR Robustness in Noisy Condition Through VAD Integration," Interspeech 2022, pp. 3784-3788, Sep. 18-22, 2022.

Rahhal Errattahi et al., "Automatic Speech Recognition Errors Detection Using Supervised Learning Techniques," 2016 IEEE/ACS 13th International Conference of Computer Systems and Applications (AICCSA) Nov./Dec. 2016 (6 pages).

(Continued)

*Primary Examiner* — Anne L Thomas-Homescu
(74) *Attorney, Agent, or Firm* — Teddi E. Maranzano

(57) ABSTRACT

Techniques for training a neural transducer-based automatic speech recognition model to be robust against background additive noise and thereby reducing insertion errors. In one aspect, a method of training an automatic speech recognition model includes: generating a modified training data set from an initial training dataset by concatenating one-word utterances with a preceding or a succeeding sentence in the initial training dataset based on a duration of silence between the one-word utterances and the preceding or the succeeding sentence; and training the automatic speech recognition model using the modified training data set.

17 Claims, 6 Drawing Sheets

(56) References Cited

OTHER PUBLICATIONS

I-Fan Chen et al., "Investigation of Training Label Error Impact on RNN-T," arXiv:2112.00350v1 (Dec. 2021) (8 pages).
Oleksii Hrinchuk et al., "Correction of Automatic Speech Recognition with Transformer Sequence-To-Sequence Model," ICASSP 2020—2020 IEEE International Conference on Acoustics, Speech and Signal Processing (ICASSP), pp. 7074-7078 (May 2020).
Seongmin Park et al., "Improving Distinction between ASR Errors and Speech Disfluencies with Feature Space Interpolation," arXiv:2108.01812v1 (Aug. 2021) (6 pages).
Release notes for Speech to Text for IBM Cloud, Updates to English next-generation telephony models Aug. 15, 2022 (1 page)—Grace Period Disclosure.

* cited by examiner

Time Stamp | Text
500

41.98-41.59 he mentioned um i guess it was monday night or tuesday night he mentioned the state of affairs
41.19-41.06 and we all felt like finally we made it to the headlines [laughter] but
41.06-41.65 i don't know i would much rather be in the warm of sun
46.99-47.14 okay
47.26-47.67 well throughout all of this i called my parents who live in florida
47.67-47.93 and they just finished putting in a pool
47.93-48.47 so while i was sitting freezing in a pay phone outside of our house
48.47-48.99 um they were sitting by the pool and
48.99-49.20 oh it was really it was horrible
49.26-49.38 yeah
49.61-49.81 it really is
49.95-50.15 oh you do oh
50.15-50.99 i remember the earthquake last year and i y- you know i guess you didn't you like the earthquake over in san francisco and
50.99-51.36 you know you can hear about it on t._v. and you just think so
51.36-51.76 yeah exactly and you just never think it could happen to you
55.02-55.35 yeah
60.21-60.99 that's true (A) Silence duration between one-word utterance and a previous utterance is 5.34s while that with a following utterance is 0.1s. In this case, the one-word utterance is combined with a following sentence to make one sentence (B) Both previous and following utterance satisfy the constraint. In this case, the utterance to be combined is randomly selected or an additional constraint is used (C) Silence durations for both utterances are more than 3 seconds (too long). Therefore, the one-word utterance is not combined and removed from the training data set

FIG. 5

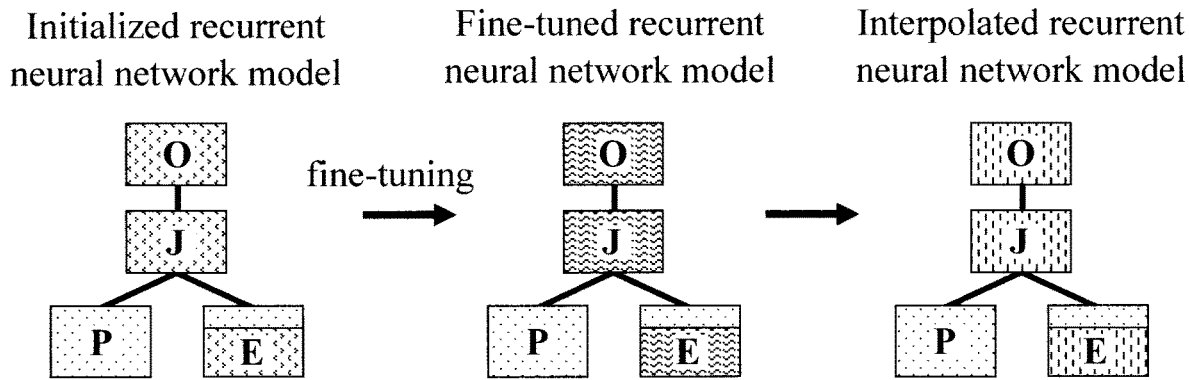

FIG. 7

$W_{p\_new} = a*W_{p\_initial} + (1-a)*W_{p\_finetuned}$ $W_{r\_new} = b*W_{r\_initial} + (1-b)*W_{r\_finetuned}$ $W_p$ : Network parameters initialized with pre-trained model $W_r$ : Network parameters of the pre-trained model to which special initialization was applied using random value (or an interpolation at an initial stage)

a: Interpolation weight at the final step for network parameters initialized with pre-trained model b: Interpolation weight at the final step for network parameters initialized with random value (or by an interpolation at an initialization stage)

FIG. 8

REDUCING INSERTION ERRORS IN NEURAL TRANSDUCER-BASED AUTOMATIC SPEECH RECOGNITION

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S):
Release notes for Speech to Text for IBM Cloud, Updates to English next-generation telephony models 15 Aug. 2022 (1 page).

FIELD OF THE INVENTION

The present invention relates to automatic speech recognition, and more particularly, to techniques for training a neural transducer-based automatic speech recognition model to be robust against background additive noise by concatenating one-word utterances in the training data.

BACKGROUND OF THE INVENTION

A recurrent neural network transducer-based automatic speech recognition model provides a framework that enables transcription of audio data into a character sequence. Such automatic speech recognition capabilities can be employed to produce transcripts of spoken audio for a variety of different applications.

However, recurrent neural network transducer-based automatic speech recognition systems tend to be very sensitive to background additive noise, which the system can mistakenly regard as speech signals. As a result, the system recognizes these background additive noise signals as certain words despite them not being spoken audio at all. Doing so causes insertion errors in the transcription.

Further, automatic speech recognition systems are often deployed together with a voice activated detection system which runs the automatic speech recognition only on voiced acoustic signals such as human speech. Conversely, the voice activated detection system deactivates the automatic speech recognition during non-speech portions of an audio session.

Thus, one potential way to address background additive noise sensitivity is to improve the ability of the voice activated detection system to decipher between speech and non-speech audio. Currently, however, there is not enough voice activated detection training data to accomplish this task.

Therefore, improved techniques for reducing insertion errors in recurrent neural network transducer-based automatic speech recognition systems due to background additive noise would be desirable.

SUMMARY OF THE INVENTION

The present invention provides techniques for training a neural transducer-based automatic speech recognition model to be robust against background additive noise by concatenating one-word utterances in the training data. In one aspect of the invention, a method of training an automatic speech recognition model is provided. The method includes: generating a modified training data set from an initial training dataset by concatenating one-word utterances with a preceding or a succeeding sentence in the initial training dataset based on a duration of silence between the one-word utterances and the preceding or the succeeding sentence; and training the automatic speech recognition model using the modified training data set.

In one exemplary embodiment, the automatic speech recognition model is a recurrent neural network transducer model having an encoder network, a predictor network, and a joint network that combines output from the encoder network and the predictor network. In that case, prior to the training, portions of the recurrent neural network transducer model can be initialized with a randomized value, and other portions of the recurrent neural network transducer model can be initialized with a value from a pre-trained recurrent neural network transducer model. Doing so helps to diminish the classification ability of those parts of the recurrent neural network transducer model which represent high-level language information before the training.

A more complete understanding of the present invention, as well as further features and advantages of the present invention, will be obtained by reference to the following detailed description and drawings.

BRIEF DESCRIPTION OF THE DRAWINGS

FIG. 5 is a diagram illustrating an exemplary initial training dataset containing one-word utterances according to an embodiment of the present invention;

FIG. 7 is a diagram illustrating a specialized initialization, training and interpolation process for a recurrent neural network transducer according to an embodiment of the present invention; and FIG. 8 is a diagram illustrating different interpolation weights being employed during interpolation according to an embodiment of the present invention.

DETAILED DESCRIPTION OF PREFERRED EMBODIMENTS

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
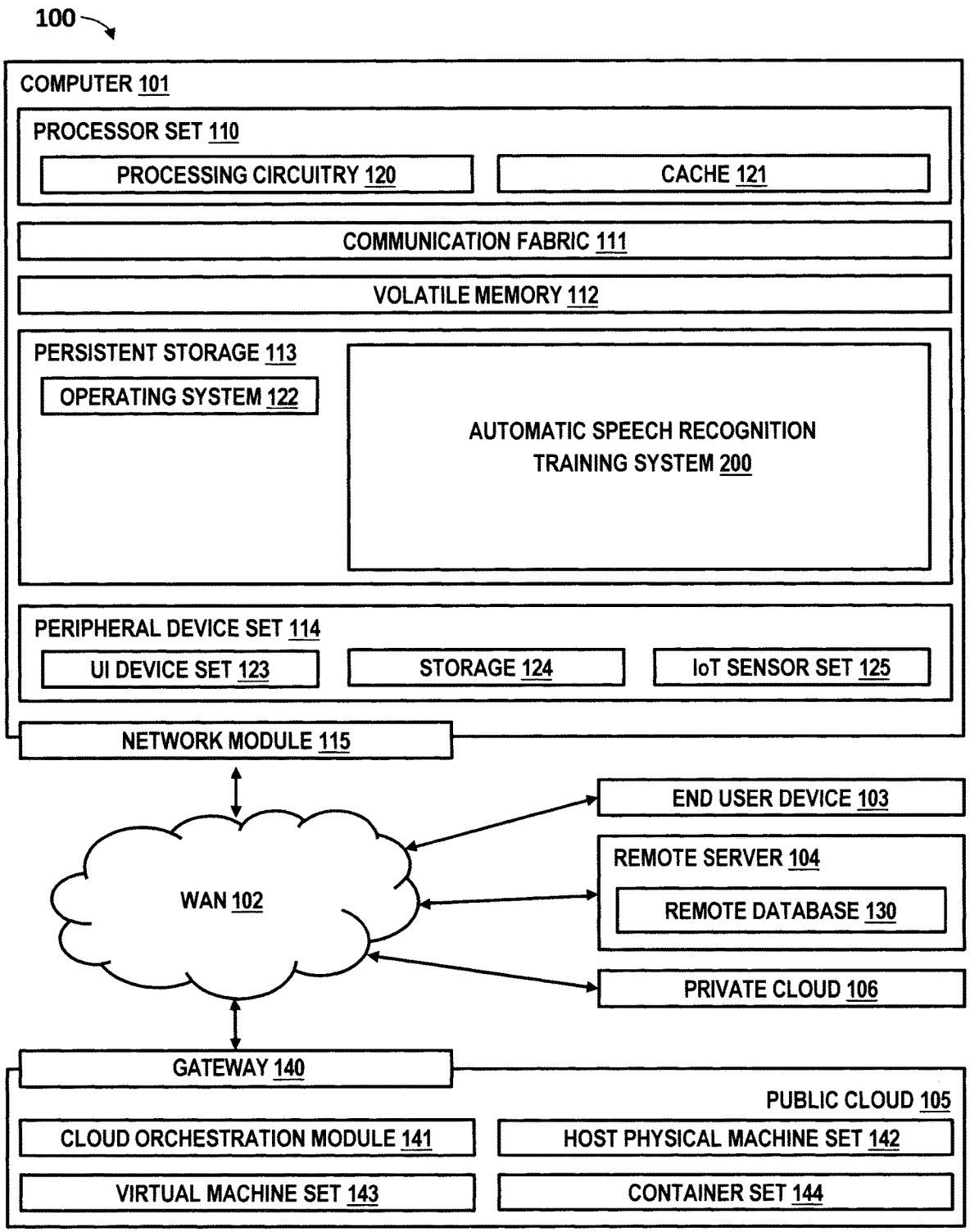
FIG. 1 is a diagram illustrating an exemplary computing environment according to an embodiment of the present invention.

Referring to FIG. 1, computing environment 100 contains an example of an environment for the execution of at least some of the computer code involved in performing the inventive methods, such as automatic speech recognition training system 200 for robustness to background additive noise. In addition to system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in system 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in system 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As highlighted above, neural transducer-based automatic speech recognition systems tend to be very sensitive to background additive noise. As a result, the system can undesirably recognize this background additive noise as speech signals, causing insertion errors in the transcription. Namely, neural transducer-based automatic speech recognition systems are often deployed together with a voice activated detection system. The voice activated detection system detects the presence or absence of human speech, and runs the automatic speech recognition only on voiced acoustic signals. Problems arise, however, when the voice activated detection system mistakes background additive noise as voiced acoustic signals, producing insertion errors.

Advantageously, it has been found herein that very short background additive noise signals (e.g., those that are less than about 100 milliseconds) are particularly prone to be mistaken as speech signals by voice activated detection systems, and further that those very short background additive noise signals are then recognized (mistakenly) as one-word utterances, e.g., 'Okay,' 'Yeah,' etc. by the associated neural transducer-based automatic speech recognition system. In turn, these one-word utterances appear as an insertion error in the transcription.

Thus, provided herein are techniques for reducing insertion errors (due to a failure of the voice activated detection systems in correctly identifying background noise) by improving neural transducer-based automatic speech recognition models through training data generation, network initialization, and module-wise interpolation. The notion here is that these one-word utterances that appear as insertion errors are included in the training data for the neural transducer-based automatic speech recognition model. By improving recognition for background noise-generated one-word utterances, the robustness of the present neural transducer-based automatic speech recognition models against insertion errors is greatly enhanced.

Figure 2:
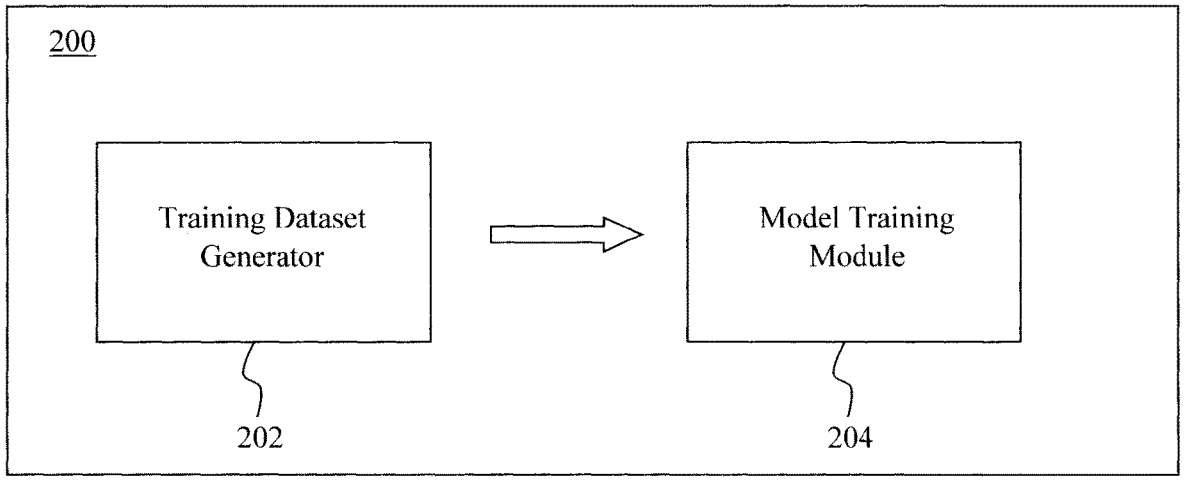
FIG. 2 is a diagram illustrating an exemplary automatic speech recognition training system for robustness against background additive noise according to an embodiment of the present invention.

FIG. 2 is a diagram providing a general overview of automatic speech recognition training system 200 in accordance with the present techniques. As shown in FIG. 2, system 200 includes a training dataset generator 202 and a model training module 204. An overall goal of system 200 is to train an automatic speech recognition model to be robust against the background additive noise that is often mistakenly recognized as speech, and which undesirably leads to insertion errors. To do so, the training dataset generator 202 will be employed to create a training dataset where one-word utterances are concatenated with the preceding or succeeding sentence. This technique leverages the finding highlighted above that very short background additive noise signals are routinely misrecognized as words included in the training data as one-word utterances such as 'Okay' and 'Yeah'. Thus, by concatenating one-word utterances with their preceding or succeeding sentence, training dataset generator 202 can generate a modified training dataset without the occurrence of these single words alone. As will become apparent from the description that follows, 'one-word utterance' refers to a single word utterance in a training dataset that is separated from a preceding multi-word sentence and a succeeding multi-word sentence by a certain duration of silence. For instance, by way of example only, in a conversion a first speaker may make a statement (i.e., the preceding multi-word sentence) to which a second speaker may reply with a one-word utterances such as 'Okay' and, 'Yeah' (i.e., the single word utterance). The first speaker might then continue the conversion (i.e., the succeeding multi-word sentence).

Subsequent use of the modified training dataset for fine-tuning will help to make the automatic speech recognition model insensitive to very short background additive noise signals. The notion here is that very short background additive noise signals have a duration similar to one-word utterances. Thus, if there are many one-word utterances in the training data, then the reaction of the trained model to very short background additive noise signals becomes very strong, and the probability that the model will react to very short background additive noise signals falsely is increased based on their similar duration to one-word utterances. However, the converse is also true. Namely, if one-word utterances are not present in the training data, then the reaction of the trained model to very short background additive noise signals (of a similar duration to one-word utterances) becomes very weak, and the probability that the model will react to very short background additive noise signals falsely is vastly decreased.

It is notable that the intention is to decrease the sensitivity of the trained model for one-word utterances (having a similar duration to very short background additive noise signals) not for the words themselves. As such, just removing one-word utterances from the training data set altogether can undesirably degrade performance for the words themselves in test time. Thus, the unique solution proposed herein is to concatenate the one-word utterances with their preceding or succeeding sentence to maintain classification ability of the trained model for the words themselves while, at the same time, minimizing or eliminating insertion errors caused by very short background additive noise signals.

The training dataset generated by the training dataset generator 202 is then used to fine-tune an automatic speech recognition machine learning model. According to an exemplary embodiment, the machine learning model is a neural transducer-based automatic speech recognition model. In machine learning and cognitive science, neural networks are a family of statistical learning models inspired by the biological neural networks of animals, and in particular the brain. Neural networks may be used to estimate or approximate systems and cognitive functions that depend on a large number of inputs and weights of the connections which are generally unknown. Neural networks are often embodied as so-called "neuromorphic" systems of interconnected processor elements which act as simulated "neurons" that exchange "messages" between each other in the form of electronic signals.

Figure 3:
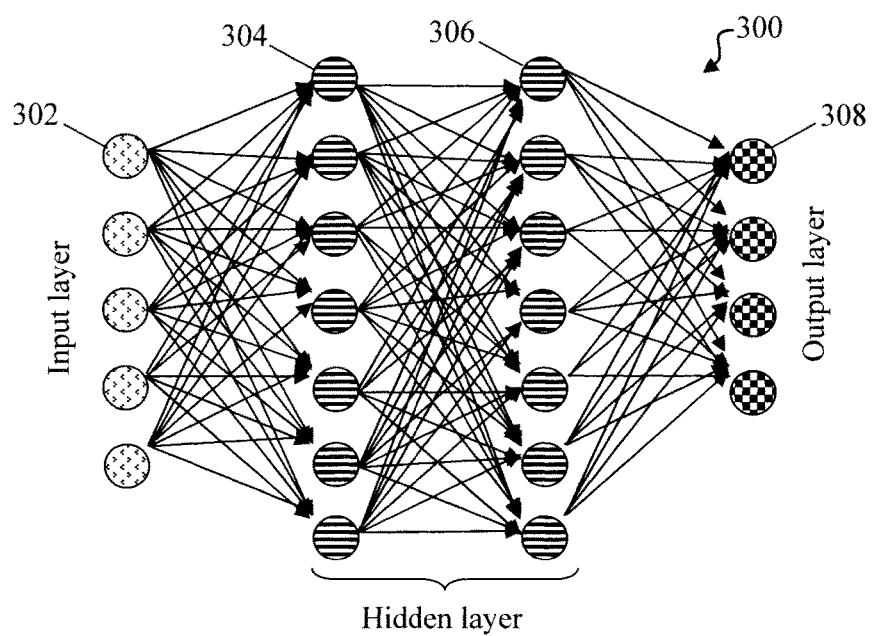
FIG. 3 is a diagram illustrating an exemplary neural network according to an embodiment of the present invention.

See, for example, exemplary neural network 300 shown in FIG. 3 that includes a plurality of interconnected processor elements 302, 304/306 and 308 that form an input layer, at least one hidden layer, and an output layer, respectively, of the neural network 300. The connections in neural networks that carry electronic messages between simulated neurons are provided with numeric weights that correspond to the strength or weakness of a given connection. These numeric weights can be adjusted and tuned based on experience, making neural networks adaptive to inputs and capable of learning. Typically, neural networks are trained on labeled sets of training data. Once trained, the neural network can be used for inference. Inference applies knowledge from a trained neural network model and uses it to infer a result. A fully connected layer (typically the last or last few layers in a neural network) is a layer where all of the inputs from one layer are connected to every activation unit of the next layer. The fully connected layer(s) compile the data extracted by previous layers of the neural network to form the final output.

In some embodiments, the transducer-based automatic speech recognition system is a recurrent neural network transducer. A recurrent neural network transducer is one type of neural prediction architecture that can be used for deep learning and speech recognition. As compared to a connectionist temporal classification (CTC) model (which requires an external language model), a recurrent neural network transducer is composed of three networks that are jointly trained, namely an encoder network, a predictor network and a joint network. Similar to an acoustic model, the encoder network models the acoustic features of input speech signals with some feature extraction process. The predictor network serves as a language model that represents an occurrence probability of word sequences in text including one-word text. Like a standard language model, the predictor network is autoregressive in that it takes in previous outputs and produces features that are used for predicting the next output. The joint network is a feedforward network that combines output predictions from the encoder network and the predictor network and produces a label.

Embodiments are contemplated herein where the model training module 204 employs a special initialization process prior to training a recurrent neural network transducer model on the modified training dataset (i.e., the training dataset where one-word utterances alone do not exist—see above). This special initialization process focuses on the portions of the recurrent neural network transducer model that play a significant role in text (linguistic information) processing. For instance, as will be described in detail below, the model training module 204 can initialize the predictor network and one or more layers of the encoder network with a random value or, more preferably, an interpolation of the random value with a pre-trained model (to create random noise), while the other parts of the recurrent neural network transducer model are initialized with the pre-trained model.

Namely, the fine-tuning of a recurrent neural network transducer model can generally involve the use of a previously-trained (aka pre-trained) model and a new model (trained on new data) that is interpolated with the pre-trained model. However, with the present techniques, the predictor network and a layer(s) of the encoder network, i.e., those portions of the recurrent neural network transducer that play a significant role in text (linguistic information) processing, are first initialized with a random value/random noise. Namely, as highlighted above, in a recurrent neural network transducer model acoustic and language modeling are included in a single model, whereby the encoder network models the acoustic features of input speech signals, and the predictor network serves as a language model that represents an occurrence probability of word sequences in text including one-word text. Further, the layers of the encoder network may be roughly classified into two parts based on their function. For instance, from bottom-to-top (input-to-output), the bottom layers of the encoder network perform low-level acoustic signal analysis, and the top layer or layers of the encoder network handle more high-level language information like that represented in a language model (though not in the same manner as a language model). Thus, it is the predictor network and the top layer(s) of the encoder network, both of which handle the high-level language information that plays a significant role in text processing, that are randomly initialized. Doing so weakens the classification ability of those parts of the recurrent neural network transducer model which represent high-level language information before the training.

Once initialized, the recurrent neural network transducer model is fine-tuned using the modified training dataset from training dataset generator 202. A model interpolation is performed between the fine-tuned recurrent neural network transducer model and the pre-trained model. As will be described in detail below, different interpolation weights are preferably employed for the parts of the fine-tuned recurrent neural network transducer model that were randomly initialized as compared to those parts initialized with the pre-trained model. Notably, it has been found herein that the classification ability of a recurrent neural network transducer model for one-word utterances tends to undesirably remain when the new model is trained from the pre-trained model as is, i.e., without using the present special initialization process.

Figure 4:
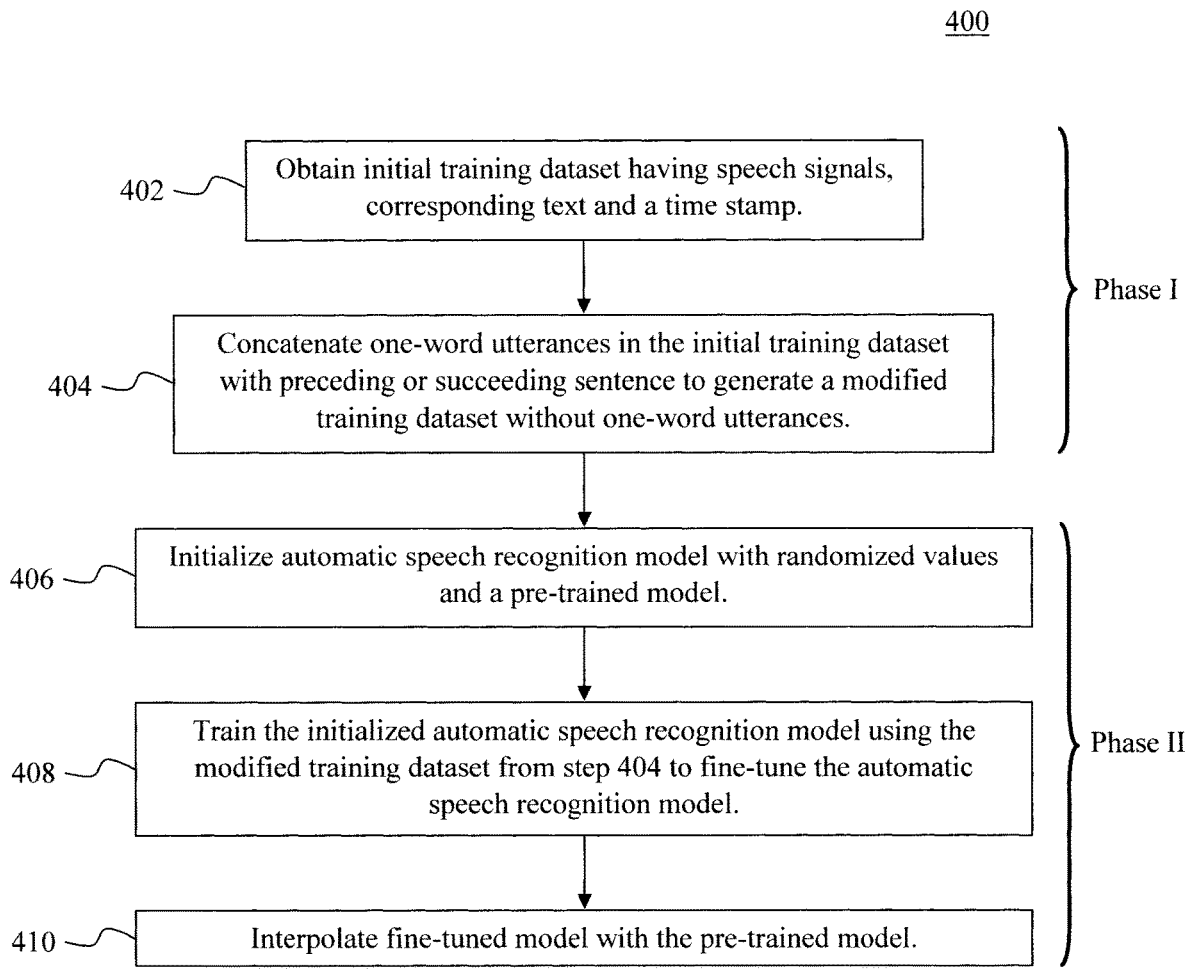
FIG. 4 is a diagram illustrating an exemplary methodology for training an automatic speech recognition system according to an embodiment of the present invention.

Given the above overview, an exemplary methodology 400 is provided in FIG. 4 for training an automatic speech recognition model to be robust against background additive noise. Methodology 400 includes two phases, i.e., a first phase (Phase I) where concatenating one-word utterances with the preceding or succeeding sentences is used to create a modified training dataset from an initial training dataset, and a second phase (Phase II) where the modified training dataset from Phase I is used to train the automatic speech recognition model. According to an exemplary embodiment, Phase I of methodology 400 is performed by training dataset generator 202 and Phase II of methodology 400 is performed by model training module 204 of automatic speech recognition training system 200. Further, while the description below uses a recurrent neural network transducer model as an example, it is to be understood that the present techniques are more generally applicable to the training of any type of automatic speech recognition model.

In step 402, an initial training dataset is obtained that includes speech signals (i.e., sound/audio signals) and corresponding text along with a time stamp. By way of example only, a publicly available dataset can be used as the initial training dataset, as long as it has the requisite timestamped speech signals and corresponding text. For illustrative purposes only, an example of an initial training dataset 500 is provided in FIG. 5. Referring briefly to FIG. 5, it can be seen that initial training dataset 500 includes text (corresponding to speech signals) and a time stamp. Included in the text are one-word utterances (highlighted in bold along with their associated time stamp) such as 'okay' and 'yeah'. If this initial training dataset 500 was used, then the existence of these one-word utterances would actually enhance recognition of the speech that is mistaken for short background additive noise signals, undesirably leading to insertion errors.

However, in step 404, the one-word utterances in initial training dataset 500 (in this example, 'okay' and 'yeah') are concatenated with the preceding or succeeding sentence to generate a modified training dataset. By 'concatenate' it is meant that a one-word utterance is combined with the preceding or succeeding sentence such that the word becomes part of the preceding or succeeding sentence, and thus is no longer present in the modified training dataset as a one-word utterance.

Figure 6:
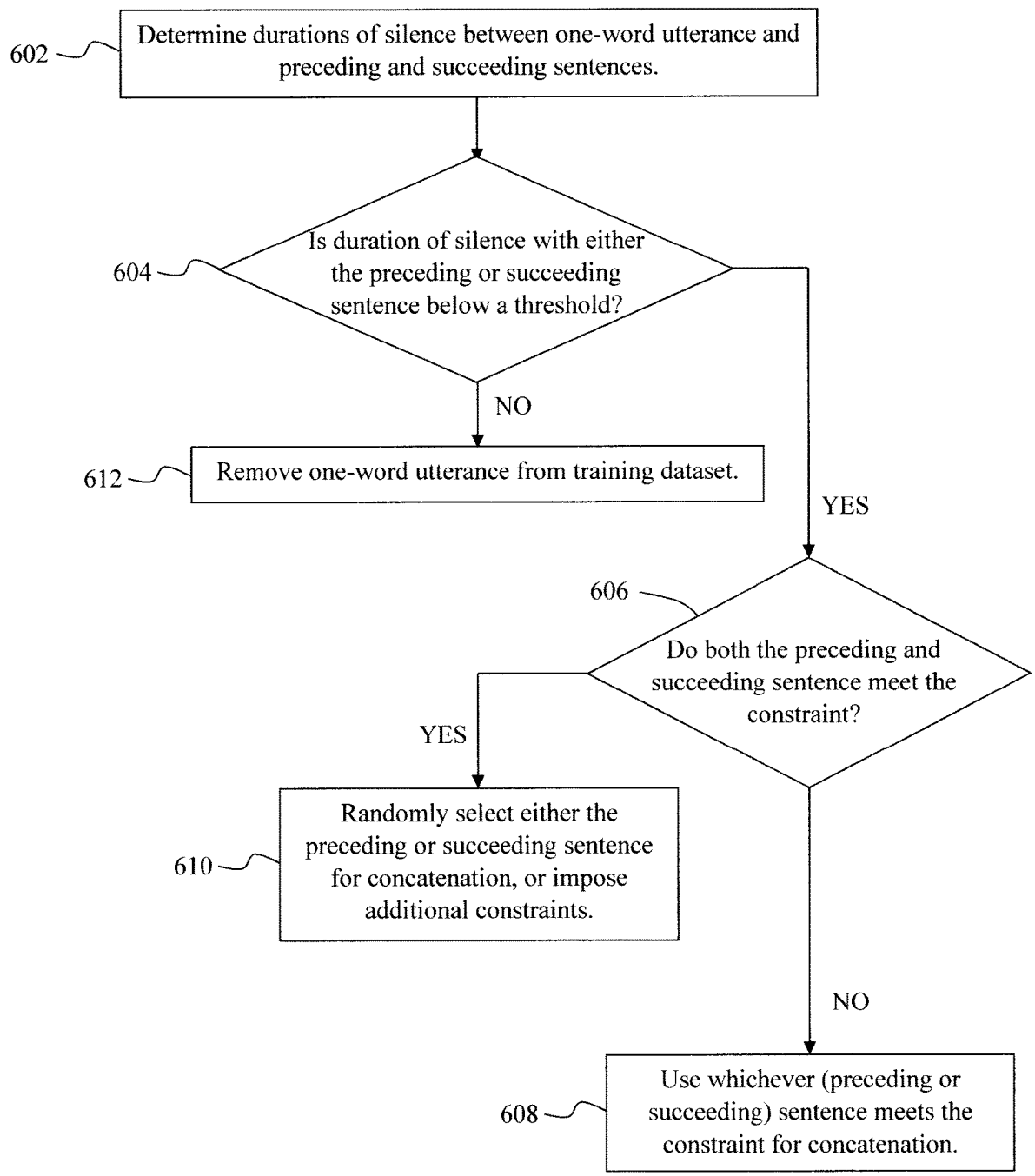
FIG. 6 is a diagram illustrating an exemplary methodology for concatenating one-word utterances with a preceding or succeeding sentence in an initial training dataset according to an embodiment of the present invention.

According to an exemplary embodiment, a duration of silence (i.e., the duration of the non-speech portion) between the one-word utterance and the preceding or succeeding sentence is used to determine whether to concatenate the one-word utterance with the preceding sentence or the succeeding sentence or, in the case of a duration of silence that is just too long, to remove the one-word utterance from the training dataset. For instance, referring to methodology 600 in FIG. 6, in step 602 the durations of silence/non-speech between a given one-word utterance and the preceding and succeeding sentence in the initial training dataset is determined. For instance, using initial training dataset 500 of FIG. 5 as an example, the duration of silence between the one-word utterance 'okay' and the preceding sentence 'i don't know i would much rather be in the warm of sun' is 46.99–41.65=5.34 seconds, and the duration of silence between 'okay' and the succeeding sentence 'well throughout all of this i called my parents who live in florida' is 47.26–47.14=0.1 seconds.

In step 604, a determination is made as to whether the duration of silence between either the one-word utterance (e.g., 'okay') and the preceding sentence (e.g., 5.34 seconds) or the succeeding sentence (e.g., 0.1 seconds) is less than or equal to a given threshold. The use of threshold is to ensure that the duration of silence/non-speech between the one-word utterance and the preceding or succeeding sentence is not too long. Namely, if the duration of silence is too long, then the non-speech portion will factor too much into the model training. In other words, if the amount of training data for non-speech increases, it also means that the amount of speech training data is relatively reduced. Doing so, can degrade the classification ability of the model for speech data (the data in the speech portion), while also undesirably improving the classification ability of the model for non-speech/noise signals which can include background noise. The threshold can be set by a user. According to an exemplary embodiment, the threshold is less than or equal to 1 second.

If it is determined in step 604 that, YES, the duration of silence between the one-word utterance and the preceding sentence and/or the succeeding sentence is less than or equal to the threshold (e.g., less than or equal to 1 second), then in step 606 a determination is made as to whether both (a) the duration of silence between the one-word utterance and the preceding sentence and (b) the duration of silence between the one-word utterance and the succeeding sentence meet the constraint, i.e., they are both less than or equal to the threshold. If it is determined in step 606 that, NO. (a) the duration of silence between the one-word utterance and the preceding sentence and (b) the duration of silence between the one-word utterance and the succeeding sentence do not both meet the constraint (i.e., only one of the preceding or succeeding sentence meets the constraint), then in step 608 the one-word utterance is concatenated with whichever (preceding or succeeding) sentence meets the constraint.

This concept is illustrated in scenario A in FIG. 5. Namely, the duration of silence between the one-word utterance 'okay' and the preceding sentence 'i don't know i would much rather be in the warm of sun' is 5.34 seconds which is greater than the threshold (e.g., 1 second). However, the duration of silence between 'okay' and the succeeding sentence 'well throughout all of this i called my parents who live in florida' is 0.1 seconds which is less than the threshold. In that case, the one-word utterance 'okay' is concatenated with the succeeding sentence, i.e., 'well throughout all of this i called my parents who live in florida okay.'

If, on the other hand, it is determined in step 606 that. YES, (a) the duration of silence between the one-word utterance and the preceding sentence and (b) the duration of silence between the one-word utterance and the succeeding sentence both meet the constraint, then in step 610 the preceding or succeeding sentence is randomly selected and concatenated with the one-word utterance. This concept is illustrated in scenario B in FIG. 5. Namely, the duration of silence between the first instance of the one-word utterance 'yeah' and the preceding sentence 'oh it was really horrible' is 0.06 seconds, and the duration of silence between the first instance of the one-word utterance 'yeah' and the succeeding sentence 'it really is' is 0.23 seconds both of which are less than the threshold (e.g., 1 second). Thus, in that case, the one-word utterance can be randomly concatenated with either the preceding sentence, i.e., 'oh it was really horrible yeah' or the succeeding sentence 'it really is yeah.'

Alternatively, in step 610 one or more additional constraints can be imposed in order to select either the preceding or succeeding sentence for concatenation. For instance, the threshold duration for silence can be shortened until only one (preceding or succeeding) sentence meets the criteria. A further constraint could be sentence perplexity. The sentence perplexity is a value which represents a naturalness of the sentence as a word sequence. This value can be obtained by a language model. In other words, a proper (i.e., grammatically and semantically correct) sentence is chosen by comparing the perplexities of two sentences (checking which sentence is more natural in terms of perplexity), where the sentence with the lower perplexity value is more likely to be grammatically and semantically correct.

It may also be the case that neither the preceding or succeeding sentence meets the criteria, namely the durations of silence between the one-word utterance and the preceding and succeeding sentences are both greater than the threshold duration. In that case, the corresponding one-word utterance is simply removed from the training dataset. For instance, if it is determined in step 604 that, NO, the duration of silence between the one-word utterance and the preceding sentence and/or the succeeding sentence is not less than or equal to the threshold (e.g., less than or equal to 1 second), then in step 612 the respective one-word utterance is removed from the training dataset altogether rather than concatenating it, and that instance of the word will not appear in the modified training dataset. This concept is illustrated in scenario C in FIG. 5. Namely, the duration of silence between the second instance of the one-word utterance 'yeah' and the preceding sentence 'yeah exactly and you just never think it could happen to you' is 3.26 seconds, and the duration of silence between the second instance of the one-word utterance 'yeah' and the succeeding sentence 'that's true' is 4.86 seconds both of which are greater than the threshold (e.g., 1 second). Thus, in that case, the one-word utterance is not concatenated and removed from the training dataset.

It is notable that an overall goal of this process for training data generation is to make a model insensitive to non-speech/very short background additive noise signals by concatenating the one-word utterances in the training dataset rather than by helping the model recognize the noise. In other words, this process does not directly improve the classification ability of the model for very short background additive noise signals. However, as provided above, the very short background additive noise signals in question have a duration similar to a one-word utterance. Therefore, it is assumed that if there are many one-word utterances in the training dataset, then the reaction of the trained model for very short background additive noise signals becomes strong, increasing the possibility that the model will react to the short noise falsely because of the similar duration. To that point, it was recognized herein that in many cases very short background additive noise signals were misrecognized as words included in the training dataset as one-word utterance.

Once generated, the modified training dataset will be used in Phase II of the process to train the automatic speech recognition model. First however, referring back to methodology 400 of FIG. 4, in step 406 a special initialization of the model may be performed prior to training. Namely, according to an exemplary embodiment, the automatic speech recognition architecture is a recurrent neural network transducer model which, as provided above, is composed of three jointly-trained networks, i.e., an encoder network, a predictor network and a joint network.

In that case, step 406 involves initializing the parameters, i.e., weights, of the predictor network and the one or more top layers of the encoder network that play a significant role in text processing with a randomized value. As provided above, this is done to diminish the classification ability of those parts of the recurrent neural network transducer model which represent high-level language information before the model is trained with the modified training dataset. The parameters, i.e., weights, of the remaining networks (those other portions of the recurrent neural network transducer model not initialized with a random value) are initialized with the values from a pre-trained recurrent neural network transducer model (also referred to herein simply as the 'pre-trained model'). Namely, as highlighted above, the present techniques can involve using the pre-trained model, which has been previously trained on some dataset in the past, and training a (new) recurrent neural network transducer model with new data from the modified training dataset on top of the pre-trained model. To look at it another way, rather than training the model from scratch, an existing (pre-trained) model is used as an initial starting point. Thus, in this particular example, the pre-trained model is being used to initialize portions of the recurrent neural network transducer model. Namely, these are the portions of the recurrent neural network transducer model not initialized with a random value such as the joint network and the bottom layers of the encoder network that perform low-level acoustic signal analysis, which are initialized with values from the pre-trained model.

The goal here is to reduce the probability of one-word utterances such as 'okay' and 'yeah' being falsely recognized because of short noise by weakening a behavior of those one-word utterances from a viewpoint of language processing in the end-to-end recurrent neural network transducer model (i.e., by diminishing a classification ability for one-word utterance). Doing so indirectly leads to a reduction of insertion errors of these one-word utterances due to the short noise because it makes the system insensitive to those words.

In one exemplary embodiment, this special initialization is carried out using a completely random value for randomizing the predictor network and one or more top layers of the encoder network. Alternatively, embodiments are contemplated herein where the predictor network and one or more top layers of the encoder network are initialized with a value that is an interpolation between the value from the pre-trained model and the random value. Doing so serves to add random Gaussian noise to the pre-trained model values. An advantage to this alternative approach is that the interpolation performed after the model training (see below) will work better because the seed (i.e., origin or starting point) of the models will be the same since one is simply adding random noise to the pre-train model values and thus keeping some of the original characteristics of the pre-trained model in the initialized recurrent neural network transducer model.

In step 408, the now-initialized automatic speech recognition model is then trained using the modified training dataset from step 404. As provided above, the modified training dataset has one-word utterances concatenated/combined with the preceding or succeeding sentence or, if the constraints are not met, removed entirely from the dataset. Eliminating instances of single, one-word utterances from the modified training dataset (by concatenation) diminishes the reaction of the trained model for very short background additive noise signals of a similar duration as the one-word utterances. Training on the modified training dataset fine-tunes the automatic speech recognition model.

In step 410, the fine-tuned automatic speech recognition model is next interpolated with the pre-trained model. Doing so helps to avoid overfitting the model on the training data. Overfitting means that a model performs well on the training data, but underperforms during evaluation. This is because the model is too strongly focused on the data it has seen and thus fits too closely to the training data, making it unable to generalize that performance to unseen examples. Interpolation helps with model generalization.

FIG. 7 is a schematic diagram illustrating the performance of steps 406-410 of methodology 400 according to the exemplary embodiment where the automatic speech recognition model is a recurrent neural network transducer model. In FIG. 7, the letters E, P, J and O are used to refer to the encoder network, the predictor network, the joint network and the resulting output, respectively, of the recurrent neural network transducer model. As highlighted above, the special initialization process implemented herein uses randomized values (e.g., either a random value or an interpolation between the value from the pre-trained model and the random value) to initialize the predictor network and one or more top layers of the encoder network (as per step 406 of methodology 400). As such, the predictor network (P) and a top portion of the encoder network (E) in FIG. 7 are depicted with a different pattern in the initialized recurrent neural network transducer model from the remaining networks. i.e., the bottom layers of the encoder network (E), the joint network, and the output (O). That same convention in patterning for the predictor network (P) and the top portion of the encoder network (E) is carried through for the fine-tuned model trained on the modified training dataset (as per step 408 of methodology 400) and the interpolated model (as per step 410 of methodology 400).

It is notable that, in the Fine-tuned recurrent neural network transducer model, the property of the network as a whole is different between the differently patterned parts because of the special initialization. Thus, during interpolation it is preferable that different interpolation weights are employed for the parts of the Fine-tuned recurrent neural network transducer model that were initialized with the randomized value (i.e., either a random value or an interpolation between a random value and the value from the pre-trained model) namely the predictor network and the one or more top layers of the encoder network as compared to those parts initialized with the pre-trained model namely the joint network and the bottom layers of the encoder network. See FIG. 8.

For instance, as shown in FIG. 8, according to an exemplary embodiment:

$$W_{p\_new} = a * W_{p\_initial} + (1-a) * W_{p\_finetuned} \text{ and} \quad (1)$$

$$W_{r\_new} = b * W_{r\_initial} + (1-b) * W_{r\_finetuned}, \quad (2)$$

where $W_{p\_initial}$, $W_{p\_finetuned}$, and $W_{p\_new}$ are the initialized, fine-tuned and interpolated network parameters (weights W), respectively, initialized with the pre-trained model (p) namely those parameters of the joint network and the bottom layers of the encoder network, and where $W_{r\_initial}$, $W_{r\_finetuned}$, and $W_{r\_new}$ are the network parameters (weights W), respectively, of the parts in the pre-trained model (p) to which the special initialization was applied using a randomized value (r), i.e., either with a random value or by an interpolation between a random value and the pre-trained model namely those parameters of the predictor network and the one or more top layers of the encoder network. It is notable that the parameters $W_{r\_initial}$ to be interpolated with $W_{p\_finetuned}$ are not the parameters after the initialization with a randomized value but the parameters before the initialization with a randomized value, that is the original pre-trained model. In other words, both $W_{p\_initial}$ and $W_{r\_initial}$ are a part of the parameters of the pre-trained model, but the interpolation weights that will be applied to those portions are different. Here, a is the interpolation weight for the network parameters initialized with the pre-trained model namely those parameters of the joint network and the bottom layers of the encoder network, and b is the interpolation weight for the network parameters initialized with a randomized value, i.e., either with a random value or by an interpolation between a random value and the pre-trained model namely those parameters of the predictor network and the one or more top layers of the encoder network. Using different interpolation weights is done because, based on the above-described specialized initialization, the role of each neuron in the newly fine-tuned model is different from that of the original pre-trained model to be combined (by interpolation). Thus, combining the two models with a single interpolation weight will not work well. However, it has been found herein that interpolation with different weights for each portion, as shown for example in FIG. 8, is good.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of training an automatic speech recognition model, the method comprising:
   generating a modified training data set from an initial training dataset by concatenating one-word utterances with a preceding or a succeeding sentence in the initial training dataset based on a duration of silence between the one-word utterances and the preceding or the succeeding sentence, such that once concatenated, each of the one-word utterances is no longer present in a modified training dataset as a one-word utterance;
   determining, for each one-word utterance in the initial training dataset, whether the duration of silence between the one-word utterance and either the preceding or the succeeding sentence is less than or equal to a threshold duration;
   concatenating the one-word utterance with whichever of the preceding or the succeeding sentence with the duration of silence that is less than or equal to the threshold duration; and
   training the automatic speech recognition model using the modified training data set, wherein the automatic speech recognition model is a recurrent neural network transducer model.

2. The method of claim 1, wherein the duration of silence with both the preceding and the succeeding sentence is less than or equal to the threshold duration, and wherein the method further comprises:
   randomly selecting either the preceding or the succeeding sentence to concatenate with the one-word utterance.

3. The method of claim 1, wherein the duration of silence with both the preceding and the succeeding sentence is less than or equal to the threshold duration, and wherein the method further comprises:
   imposing at least one additional constraint to select between the preceding or the succeeding sentence to concatenate with the one-word utterance, wherein the imposing comprises: shortening the threshold duration.

4. The method of claim 1, wherein the duration of silence with both the preceding and the succeeding sentence is greater than the threshold duration, and wherein the method further comprises:
   removing the one-word utterance from the initial training dataset.

5. The method of claim 1, wherein the automatic speech recognition model comprises a recurrent neural network transducer model having an encoder network, a predictor network, and a joint network that combines output from the encoder network and the predictor network.

6. The method of claim 5, further comprising:
   initializing, prior to the training, portions of the recurrent neural network transducer model with a randomized value.

7. The method of claim 6, wherein the portions of the recurrent neural network transducer model that are initialized with the randomized value comprise the predictor network and one or more layers of the encoder network, and wherein the method further comprises:
   initializing other portions of the recurrent neural network transducer model with a value from a pre-trained recurrent neural network transducer model.

8. The method of claim 7, wherein the randomized value comprises an interpolation between a random value and the value from the pre-trained recurrent neural network transducer model.

9. The method of claim 7, further comprising:
training the recurrent neural network transducer model using the modified training data set to obtain a fine-tuned recurrent neural network transducer model; and
interpolating the fine-tuned recurrent neural network transducer model with the pre-trained recurrent neural network transducer model to avoid overfitting.

10. The method of claim 9, wherein the interpolating is performed using different interpolation weights for the portions of the recurrent neural network transducer model initialized with the randomized value as compared to the other portions of the recurrent neural network transducer model initialized with the value from the pre-trained recurrent neural network transducer model.

11. A computer program product for training an automatic speech recognition model, the computer program product comprising a computer readable storage medium having program instructions embodied therewith, the program instructions executable by a computer to cause the computer to perform:
generating a modified training data set from an initial training dataset by concatenating one-word utterances with a preceding or a succeeding sentence in the initial training dataset based on a duration of silence between the one-word utterances and the preceding or the succeeding sentence, such that once concatenated, the one-word utterances is no longer present in a modified training dataset as a one-word utterance; and
training the automatic speech recognition model using the modified training data set, wherein the automatic speech recognition model is a recurrent neural network transducer model.

12. The computer program product of claim 11, wherein the program instructions further cause the computer to perform:
determining, for each one-word utterance in the initial training dataset, whether the duration of silence between the one-word utterance and either the preceding or the succeeding sentence is less than or equal to a threshold duration, wherein the duration of silence with both the preceding and the succeeding sentence is greater than the threshold duration, and wherein the program instructions further cause the computer to remove the one-word utterance from the initial training dataset; and
concatenating the one-word utterance with whichever of the preceding or the succeeding sentence with the duration of silence that is less than or equal to the threshold duration.

13. The computer program product of claim 11, wherein the automatic speech recognition model comprises a recurrent neural network transducer model having an encoder network, a predictor network, and a joint network that combines output from the encoder network and the predictor network, and wherein the program instructions further cause the computer to perform:
initializing, prior to the training, portions of the recurrent neural network transducer model with a randomized value; and
initializing other portions of the recurrent neural network transducer model with a value from a pre-trained recurrent neural network transducer model.

14. The computer program product of claim 13, wherein the randomized value comprises an interpolation between a random value and the value from the pre-trained recurrent neural network transducer model.

15. The computer program product of claim 13, wherein the program instructions further cause the computer to perform:
training the recurrent neural network transducer model using the modified training data set to obtain a fine-tuned recurrent neural network transducer model; and
interpolating the fine-tuned recurrent neural network transducer model with the pre-trained recurrent neural network transducer model to avoid overfitting, wherein the interpolating is performed using different interpolation weights for the portions of the recurrent neural network transducer model initialized with the randomized value as compared to the other portions of the recurrent neural network transducer model initialized with the value from the pre-trained recurrent neural network transducer model.

16. A system for training an automatic speech recognition model comprising a processor, connected to a memory, operable to perform:
generating a modified training data set from an initial training dataset by concatenating one-word utterances with a preceding or a succeeding sentence in the initial training dataset based on a duration of silence between the one-word utterances and the preceding or the succeeding sentence, such that once concatenated, each of the one-word utterances is no longer present in a modified training dataset as a one-word utterance;
determining, for each one-word utterance in the initial training dataset, whether the duration of silence between the one-word utterance and either the preceding or the succeeding sentence is less than or equal to a threshold duration;
concatenating the one-word utterance with whichever of the preceding or the succeeding sentence with the duration of silence that is less than or equal to the threshold duration; and
training the automatic speech recognition model using the modified training data set training the automatic speech recognition model using the modified training data set, wherein the automatic speech recognition model is a recurrent neural network transducer model.

17. The system of claim 16, wherein the automatic speech recognition model comprises a recurrent neural network transducer model having an encoder network, a predictor network, and a joint network that combines output from the encoder network and the predictor network, and wherein the processor is further operable to perform:
initializing, prior to the training, portions of the recurrent neural network transducer model with a randomized value; and
initializing other portions of the recurrent neural network transducer model with a value from a pre-trained recurrent neural network transducer model.

* * * * *